(12) United States Patent
Su et al.

(10) Patent No.: US 7,510,335 B1
(45) Date of Patent: Mar. 31, 2009

(54) OPTICAL CONNECTOR

(75) Inventors: Bing Su, Shenzhen (CN); Li-Jun Yang, Shenzhen (CN); Hao-Zhuan Lin, Shenzhen (CN); Xiao-She Bian, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/136,011

(22) Filed: Jun. 9, 2008

(51) Int. Cl.
*G02B 6/36* (2006.01)
*G02B 6/38* (2006.01)

(52) U.S. Cl. .......................................... 385/78; 385/60

(58) Field of Classification Search ........................ None
See application file for complete search history.

(56) References Cited

FOREIGN PATENT DOCUMENTS

JP            09131767 A   *  5/1997

\* cited by examiner

*Primary Examiner*—Omar Rojas
(74) *Attorney, Agent, or Firm*—Zhigang Ma

(57) ABSTRACT

An exemplary optical connector 200 includes a first housing 20 and a second housing 24. The first housing 20 includes a main body 201. The main body 201 is elongated and hollow. One end of the main body 201 forms a resisting member 203 and the other end of the main body 201 forms a lock receiving portion 205. At least one latch hole 2051 is defined in the lock receiving portion 205 and at least one joint line 208 is formed in the lock receiving portion 205 adjacent to the at least one latch hole 2051. The extending direction of the joint line 208 is perpendicular to the longitudinal direction of the first housing 20. One end of the second housing 24 forms a lock portion 242 configured for engaging with the lock receiving portion 205. The lock portion 242 forms at least one protrusion 2423 configured for engaging with the latch hole 2051.

7 Claims, 6 Drawing Sheets

OPTICAL CONNECTOR

BACKGROUND OF THE INVENTION

1. Field of the Invention

The present invention relates to an optical connector.

2. Description of the Related Art

Referring to FIG. 5, a typical optical connector 100 is shown. The optical connector 100 includes a first housing 10, a ferrule 11, a flange 12, a spring 13, and a second housing 14.

The first housing 10 includes a main body 101. The main body 101 is an elongated piece defining a hollow center (not labeled). The main body 101 forms a resisting member 103 on a side surface and one end of the main body 101 forms a lock receiving portion 107. The lock receiving portion 107 defines two latch holes 1071 and a hollow cavity (not labeled) communicating with the latch holes 1071.

The second housing 14 includes a main body 141. The main body 141 is an elongated piece defining a hollow center (not labeled). One end of the main body 141 forms a lock portion 142 and the other end of the main body 141 opposite to the lock portion 142 forms a sleeve portion 143. The lock portion 142 is configured for engaging in the hollow cavity of the lock receiving portion 107 such that the first housing 10 is fixed to the second housing 14. The lock portion 142 forms two protrusions 1423 for engaging in the latch holes 1071 of the lock receiving portion 107 correspondingly.

To assembly the optical connector 100, the ferrule 11 is fixed to the flange 12. An optical fiber □not shown□ is inserted into the sleeve portion 143 and passes through the main body 141 and spring coils of the spring 13 in that order and fixed in the ferrule 11. The lock portion 142 is inserted into the lock receiving portion 107 and the protrusions 1423 are latched in the latch holes 1071. One end of the spring 13 resists the second housing 14 and the other end of the spring 13 resists the flange 12. Thus the spring 13, the flange 12, and the ferrule 11 are received in an enclosed space defined by the first housing 10 and the second housing 14.

The first housing 10 in FIG. 5 is made of plastic materials by injection molding method. Referring to FIG. 6, a mold plate 300 to produce the first housing 10 with injection molding is shown. The mold plate 300 forms a protrusion 310 and defines a gate 320. A shape and a size of the protrusion 310 are same to the latch hole 1071 in FIG. 5 of the first housing 10. In addition, because the resisting member 103 in FIG. 5 and the latch hole 1071 in FIG. 5 are apart with a relatively great distance, the gate 320 is generally required to be defined in a portion, which corresponds to the resisting member 103, of the mold plate 300 such that the melted material flows a relatively short distance and increases the speed of making the first housing 10. During the injection molding, a flow of a melted material 340 is divided into two branches of melted materials 330, 350 by the protrusion 310. After the two branches 330, 350 engulfs the protrusion 310, the two branch flows 330, 350 join. After the melted material is solidified to form the first housing 10, a joint line 108 adjacent to the latch hole 1071 is formed in the first housing 10. In addition, the joint line 108 extends along a longitudinal direction X of the first housing 10.

Referring to FIG. 5 again, to assembly the optical connector 100, when the lock portion 142 is inserted into the lock receiving portion 107, the lock portion 142 is squeezed into the hollow cavity of the lock receiving portion 107, inner sidewall forming the hollow cavity as a result produces tension stresses $F_1$, $F_2$ along a direction Y. The tension stresses $F_1$, $F_2$ along the direction Y, which is different from the direction X, force the joint line 108 to widen. Therefore, the first housing 10 breaks easily from the joint line 108.

Therefore, a new optical connector is desired in order to overcome the above-described shortcomings.

SUMMARY

An optical connector includes a first housing and a second housing. The first housing includes a main body. The main body is an elongated and hollow member in shape. One end of the main body forms a resisting member and the other end of the main body forms a lock receiving portion. At least one latch hole is defined in the lock receiving portion and at least one joint line is formed in the lock receiving portion adjacent to the at least one latch hole. An extending direction of the joint line is perpendicular to a longitudinal direction of the first housing. One end of the second housing forms a lock portion configured for engaging with the lock receiving portion of the first housing. The lock portion forms at least one protrusion configured for engaging with the at least one latch hole.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical connector. Moreover, in the drawings, like reference numerals designate corresponding parts throughout several views, and all the views are schematic.

DETAILED DESCRIPTION OF THE PREFERRED EMBODIMENT

Reference will now be made to the drawings to describe a preferred embodiment of the present optical connector in detail.

Figure 1:
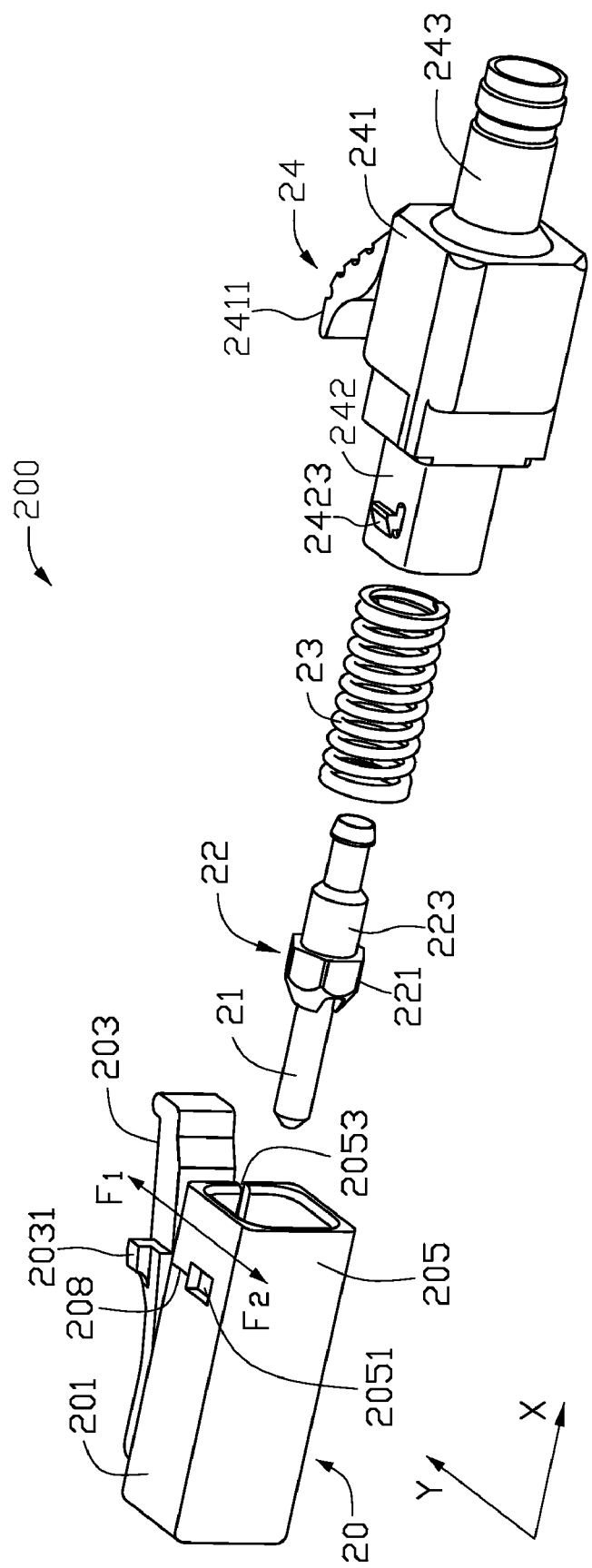
FIG. 1 is an exploded, isometric view of a housing of an optical connector in accordance with an exemplary embodiment of the present invention.

Referring to FIG. 1, an optical connector 200 of the invention is shown. The optical connector 200 includes a first housing 20, a ferrule 21, a flange 22, a spring 23, and a second housing 24.

Figure 2:
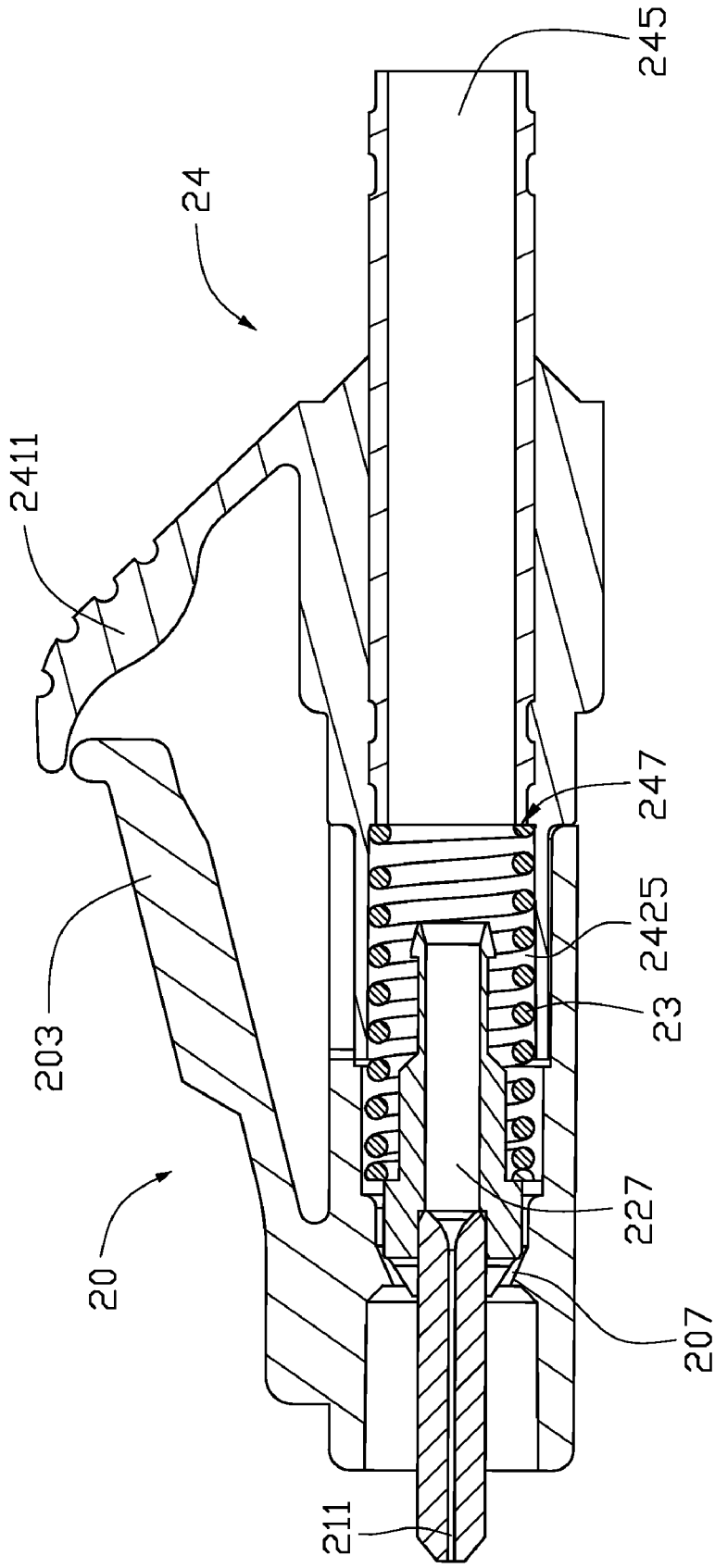
FIG. 2 is a cross-sectional view of the optical connector of FIG. 1.
Figure 3:
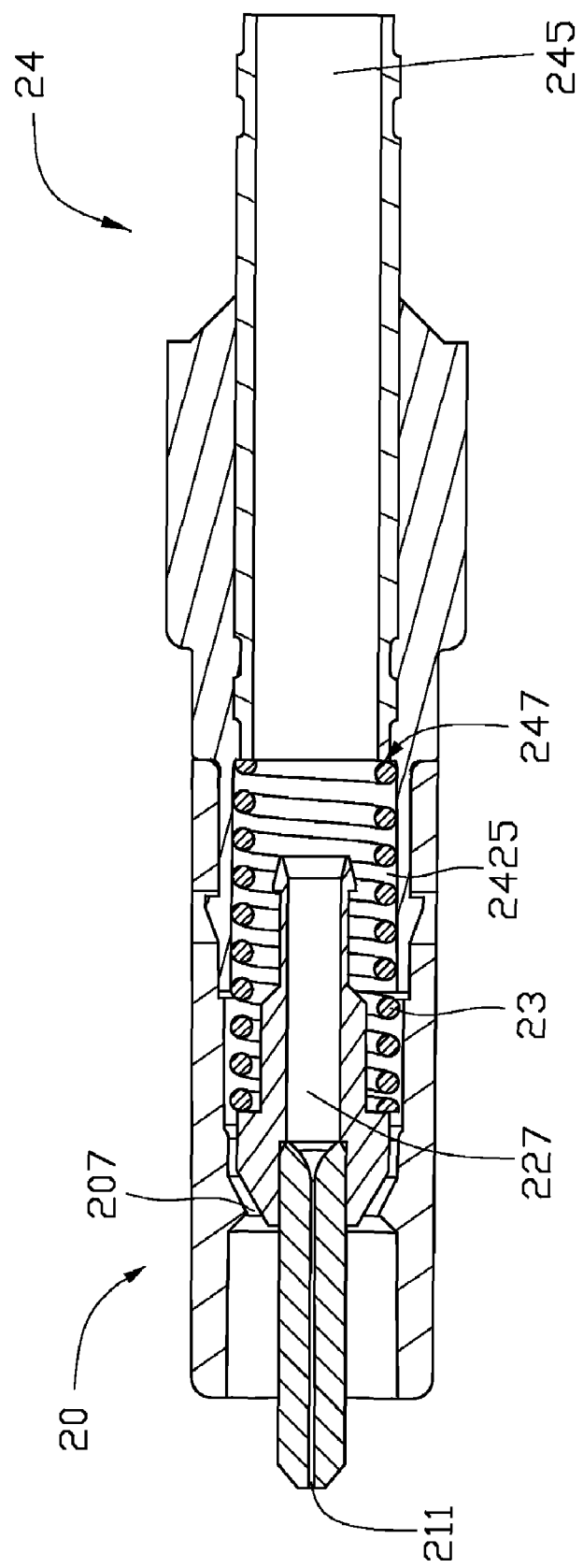
FIG. 3 is similar to FIG. 2, but showing a cross-sectional view taken along another line.

Referring to FIGS. 1 through 3, the first housing 20 includes a main body 201. The main body 201 is an elongated piece defining a hollow center (not labeled). One end of the main body 201 forms a resisting member 203 and the other end of the main body 201 defines a lock receiving portion 205. The resisting member 203 forms a protrusion 2031 configured for engaging in a groove of an adapter (not labeled). In addition, the lock receiving portion 205 defines two latch holes 2051, a slot 2053, and a hollow cavity (not labeled). The latch holes 2051 are on opposite side surfaces of the main body 201 and are rectangular in shape. The slot 2053 is defined on the same surface of the main body 201 forming the resisting member 203 and faces the resisting member 203. In addition, an inner rim 207 is formed on an inner surface of the main body 201.

The ferrule 21 is a cylinder and defines a through hole 211 configured for receiving an optical fiber.

The flange 22 includes a base 221 and an extending portion 223 extending from one end of the base 221. The base 221 defines an opening (not labeled) configured for fixing the ferrule 21. The extending portion 223 defines a through hole 227 configured for receiving the optical fiber. The through hole 227 communicates with the opening of the base 221.

The second housing 24 includes a main body 241. One end of the main body 241 forms a lock portion 242 and the other end of the main body 241, opposite to the lock portion 242, forms a sleeve portion 243. The lock portion 242 is to engage with the lock receiving portion 205 such that the first housing 20 is fixed to the second housing 24. The lock portion 242 defines an opening 2425 configured for fixing the spring 23 and forms two protrusions 2423 configured for engaging in the latch holes 2051 of the first housing 20. The protrusions 2423 are on opposite sides of the lock portion 242. The sleeve portion 243 is a cylinder in shape. The sleeve portion 243 defines a through hole 245 configured for receiving the optical fiber. The through hole 245 communicates with the opening 2425. In addition, a ledge 247 is formed on a boundary between the through hole 245 and the opening 2425 of an inner surface of the second housing 24. The main body 241 also forms a holding portion 2411 on an outer surface of the main body 241 such that the main body 241 can be grasped by the holding portion 2411 easily.

To assembly the optical connector 200, the ferrule 21 is fixed to the opening of the flange 22, the optical fiber □not labeled□ passes through the through hole 245 of the second housing 24, spring coils of the spring 23, the through hole 227 of the flange 22, and the through hole 211 of the ferrule 21 in that order and is fixed in the through hole 211 of the ferrule 21. The spring 23 is sleeved on the extending portion 223 of the flange 22 and the spring 23 together with the extending portion 223 is received in the opening 2425 of the lock portion 242. The lock portion 242 of the second housing 24 is inserted into lock receiving portion 205 of the first housing 20. After that, one end of the spring 23 resists the flange base 22 and the other end of the spring 23 resists the ledge 247 such that the flange base 22 resists the inner rim 207 of the first housing 20 and the ferrule 21 is slidable along the longitudinal direction of the first housing 20.

Figure 4:
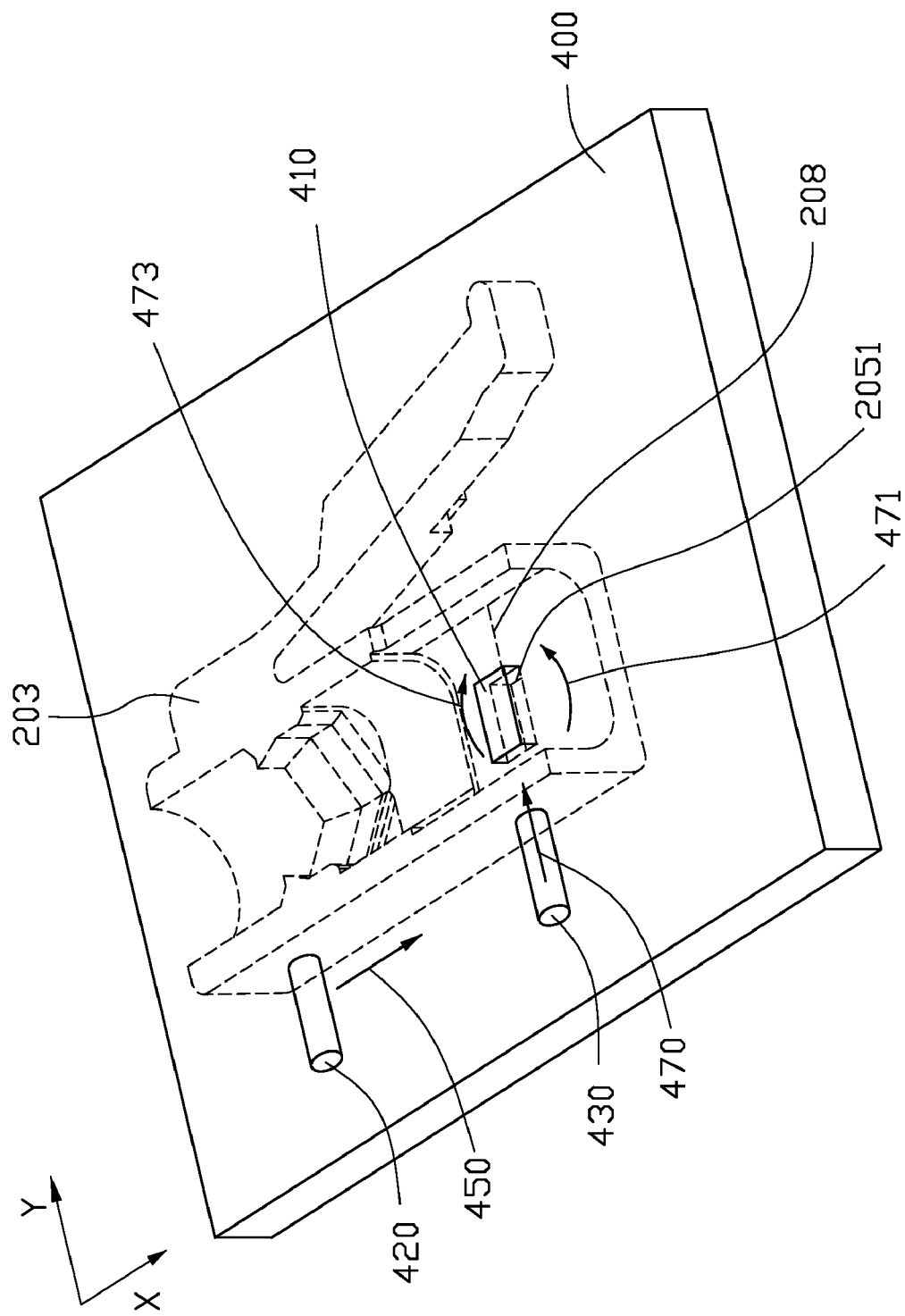
FIG. 4 is a mold plate for making a first housing of the housing of the optical connector of FIG. 1.
Figure 5:
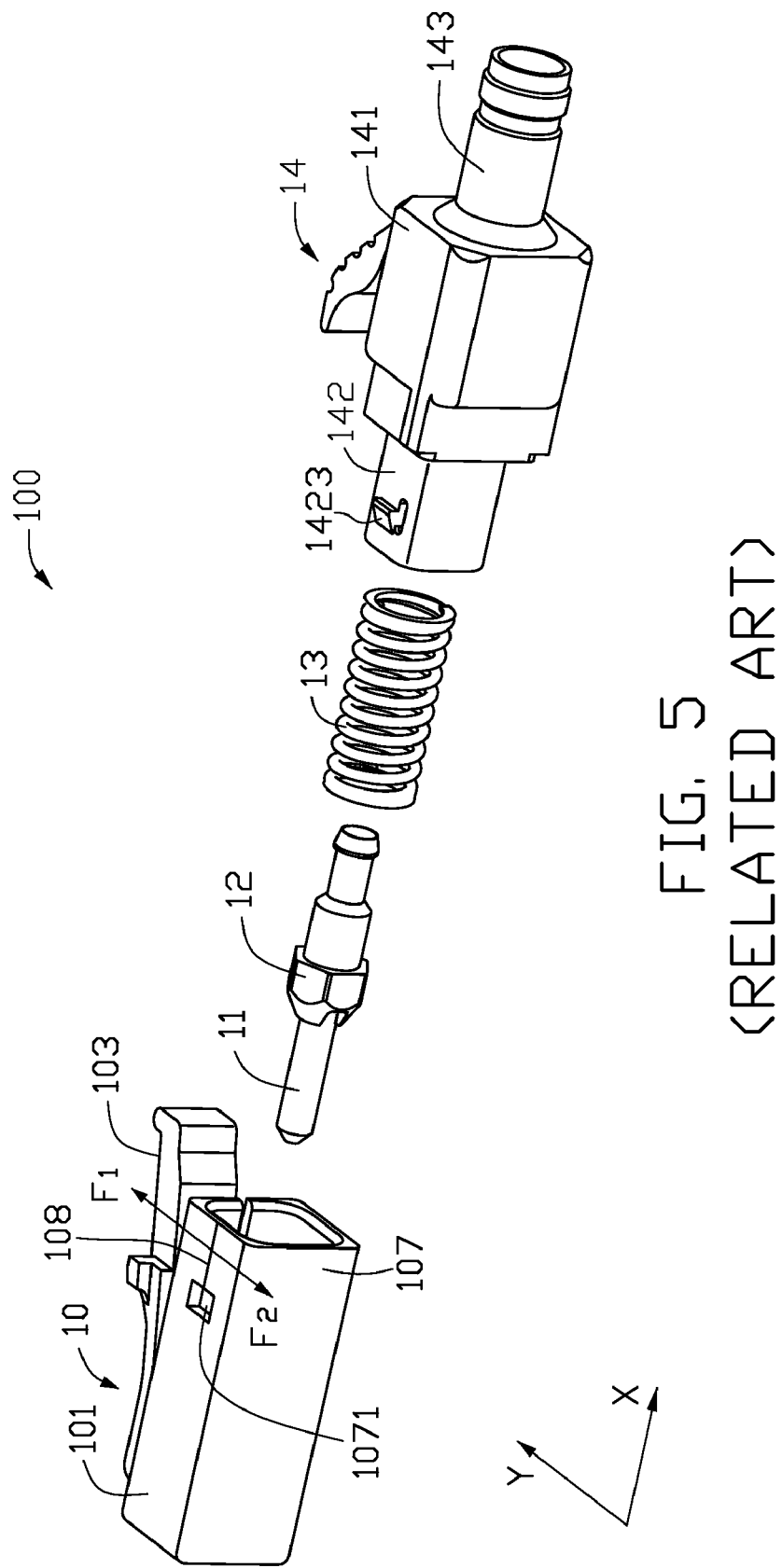
FIG. 5 is an exploded, isometric view of a housing of a conventional optical connector.
Figure 6:
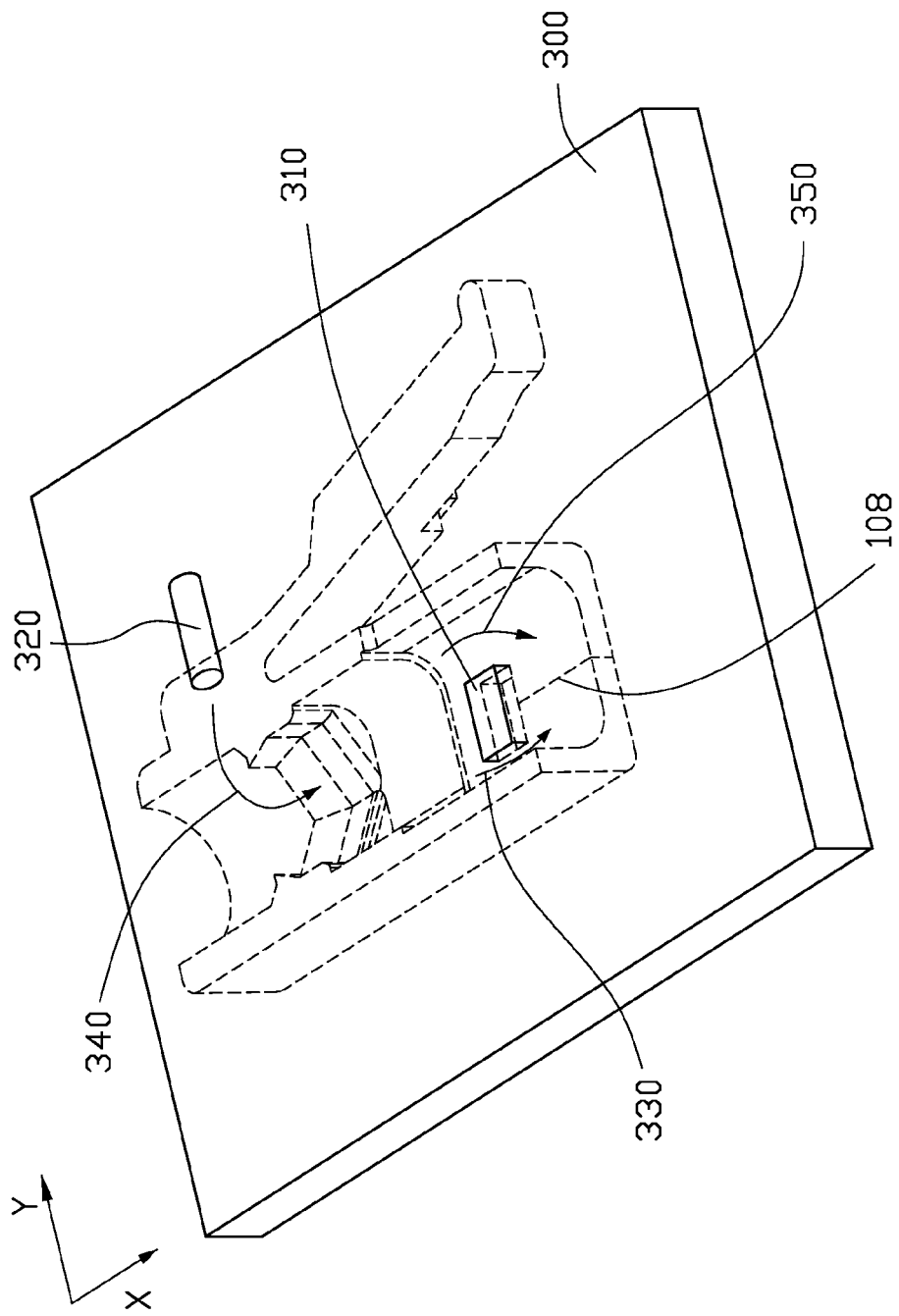
FIG. 6 is a mold plate for making a first housing of the housing of the optical connector of FIG. 5.

The first housing 20 is made of plastic materials. Referring to FIG. 4, a mold plate 400 to produce the first housing 20 with injection molding is shown. The mold plate 400 includes a protrusion 410 and two gates 420, 430. One gate 430 is adjacent to the protrusion 410. During the injection molding, two flows of melted plastic materials 450, 470 are injected into a cavity defined by the mold plate 400 and other mold parts (not shown) from the gates 420, 430 respectively. Because a distance between the gate 430 and the protrusion 410 is shorter than that between the gate 420 and the protrusion 410, the melted plastic material 470 reaches the protrusion 410 first and divides into two branches of melted plastic materials 471, 473. After the two branches 471, 473 engulf the protrusion 410, the two branch flows 471, 473 join and form a joint line 208. The joint line 208 extends along a direction Y perpendicular to the longitudinal direction X of the main body 201 of the first housing 20.

When the lock portion 242 is inserted into the lock receiving portion 205 of the first housing 20, the lock portion 242 is squeezed into the hollow cavity of the lock receiving portion 205, inner sidewalls forming the hollow cavity as a result produces tension stresses $F_1$, $F_2$. The tension stresses $F_1$, $F_2$ is in the same direction as the direction Y the joint line 208 extends along, thus the lock receiving portion 205 seldom breaks.

It can be understood that, the lock receiving portion 205 may be defined in the second housing 24, and the lock portion 242 may be formed in the first housing 20, without departing from the principles of the present invention.

It can also be understood that, the number of the gates defined in the mold plate may also be greater than two. The spring may be replaced by other resilient members.

Finally, while the preferred embodiment has been described and illustrated, the invention is not to be construed as being limited thereto. Various modifications can be made to the embodiments by those skilled in the art without departing from the true spirit and scope of the invention as defined by the appended claims.

What is claimed is:

1. An optical connector comprising:
   a first housing including a main body, the main body being elongated and hollow, one end of the main body forming a resisting member and the other end of the main body forming a lock receiving portion, the lock receiving portion defining at least one latch hole therein and forming at least one joint line adjacent to the at least one latch hole; and
   a second housing, one end of the second housing forming a lock portion for engaging with the lock receiving portion, the lock portion forming at least one protrusion for engaging in the at least one latch hole of the first housing;
   wherein the extending direction of the at least one joint line is perpendicular to the longitudinal direction of the first housing.

2. The optical connector as claimed in claim 1, wherein the extending direction of the resisting member is same to the longitudinal direction of the main body.

3. The optical connector as claimed in claim 1, further comprising a ferrule and a flange, wherein the ferrule is fixed on one end of the flange, and the ferrule and the flange are received in an enclosed space defined by the lock receiving portion and the lock portion.

4. The optical connector as claimed in claim 3, further comprising a resilient member, one end of the resilient member resisting the flange and another end of the resilient member resisting the second housing.

5. The optical connector as claimed in claim 4, wherein the resilient member is a spring.

6. The optical connector as claimed in claim 1, wherein the first housing is made of plastic material.

7. The optical connector as claimed in claim 1, wherein the lock receiving portion defines two latch holes and the lock portion forms two protrusions.

* * * * *